(12) United States Patent  
Park et al.

(10) Patent No.: US 11,954,825 B2  
(45) Date of Patent: Apr. 9, 2024

(54) IMAGE PROCESSING DEVICE AND IMAGE PROCESSING METHOD

(71) Applicant: LG INNOTEK CO., LTD., Seoul (KR)

(72) Inventors: Jung Ah Park, Seoul (KR); Seon Hee Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 523 days.

(21) Appl. No.: 17/271,544

(22) PCT Filed: Aug. 27, 2019

(86) PCT No.: PCT/KR2019/010902  
§ 371 (c)(1),  
(2) Date: Feb. 25, 2021

(87) PCT Pub. No.: WO2020/045946  
PCT Pub. Date: Mar. 5, 2020

(65) Prior Publication Data  
US 2021/0248719 A1 Aug. 12, 2021

(30) Foreign Application Priority Data  
Aug. 27, 2018 (KR) .......... 10-2018-0100444

(51) Int. Cl.  
G06T 5/00 (2006.01)  
G06T 3/4007 (2024.01)  
(Continued)

(52) U.S. Cl.  
CPC ............ *G06T 5/002* (2013.01); *G06T 3/4007* (2013.01); *G06T 5/009* (2013.01); *G06T 5/20* (2013.01);  
(Continued)

(58) Field of Classification Search  
CPC ....... G06T 5/002; G06T 3/4007; G06T 5/009; G06T 5/20; G06T 5/50;  
(Continued)

(56) References Cited

U.S. PATENT DOCUMENTS 10,999,524 B1 * 5/2021 Duelli .................. H04N 13/254  
2009/0285476 A1 * 11/2009 Choe ...................... H04N 23/60  
382/162

(Continued)

FOREIGN PATENT DOCUMENTS

CN 102334141 A 1/2012  
CN 107798658 A 3/2018  
(Continued)

*Primary Examiner* — Jose L Couso  
(74) *Attorney, Agent, or Firm* — Birch, Stewart, Kolasch & Birch, LLP

(57) ABSTRACT

An image processing method for an image processing device according to an embodiment of the present invention comprises the steps of: obtaining a first RGB image by means of an RGB camera; extracting a reflection component from the first RGB image; obtaining a TOF IR image by means of a TOF camera; and obtaining a second RGB image by calculating the reflection component of the first RGB image and the TOF IR image, wherein the TOF IR image is an amplitude or intensity image generated from an IR image with respect to four phases.

18 Claims, 7 Drawing Sheets

(51) Int. Cl.
  *G06T 5/20* (2006.01)
  *G06T 5/50* (2006.01)

(52) U.S. Cl.
  CPC ...... *G06T 5/50* (2013.01); *G06T 2207/10024* (2013.01); *G06T 2207/10048* (2013.01); *G06T 2207/20024* (2013.01); *G06T 2207/20224* (2013.01)

(58) Field of Classification Search
  CPC . G06T 2207/10024; G06T 2207/10048; G06T 2207/20024; G06T 2207/20224; G06T 2207/10028; G06T 7/90; G06T 5/001; G06T 3/4015; G06T 5/004; G06T 5/008; G06T 2207/20021; G06T 7/85; G06T 7/33; G06T 5/40; G06T 7/97; G06T 7/50; G06T 5/70; G06T 7/80; G06T 7/593; G06T 2207/20092; G06T 2207/20221; G06T 2207/20216; H04N 23/10; H04N 23/80; H04N 23/45; H04N 9/09; H04N 9/76; H04N 9/78; H04N 13/239; H04N 13/271; H04N 17/002; H04N 23/843; H04N 25/135; H04N 5/23229; H04N 2013/0081; H04N 13/128; H04N 13/268; H04N 23/958; H04N 23/959; H04N 25/17; H04N 25/705; H04N 2213/003; H04N 2213/005; G06V 10/56; G06V 10/143; G06V 10/147; G06V 10/751; G06V 30/19013; G06K 9/6288; G01S 7/497

See application file for complete search history.

(56) References Cited

U.S. PATENT DOCUMENTS

| | | | |
|---|---|---|---|
| 2011/0293179 A1* | 12/2011 | Dikmen | G06T 5/008 382/167 |
| 2014/0320707 A1* | 10/2014 | Olson | H04N 23/843 348/262 |
| 2015/0256813 A1* | 9/2015 | Dal Mutto | H04N 5/33 348/47 |
| 2017/0004609 A1 | 1/2017 | Strandemar | |
| 2017/0272651 A1* | 9/2017 | Mathy | H04N 5/2226 |
| 2018/0068424 A1 | 3/2018 | Kwon et al. | |
| 2018/0089847 A1* | 3/2018 | Lee | G01S 7/4865 |
| 2018/0205926 A1* | 7/2018 | Mogalapalli | H04N 13/122 |
| 2018/0227509 A1 | 8/2018 | Huang et al. | |
| 2020/0074608 A1* | 3/2020 | Beshinski | G06T 7/80 |

FOREIGN PATENT DOCUMENTS

| | | |
|---|---|---|
| KR | 10-2009-0120159 A | 11/2009 |
| KR | 10-1773887 B1 | 9/2017 |
| KR | 10-2018-0027952 A | 3/2018 |

\* cited by examiner

[FIG. 1]
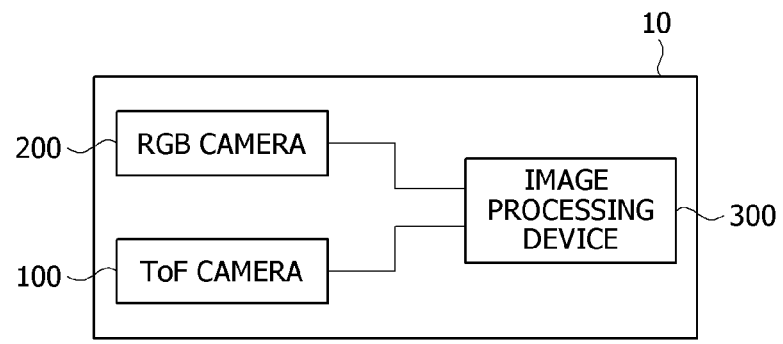
[FIG. 2]
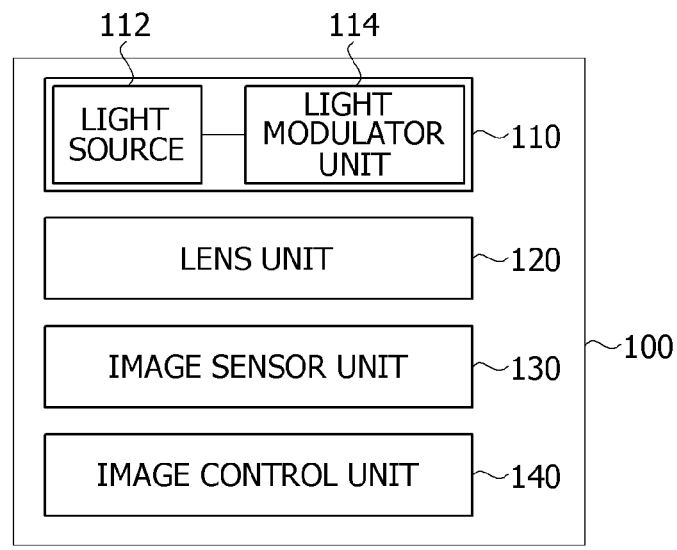

[FIG. 3]
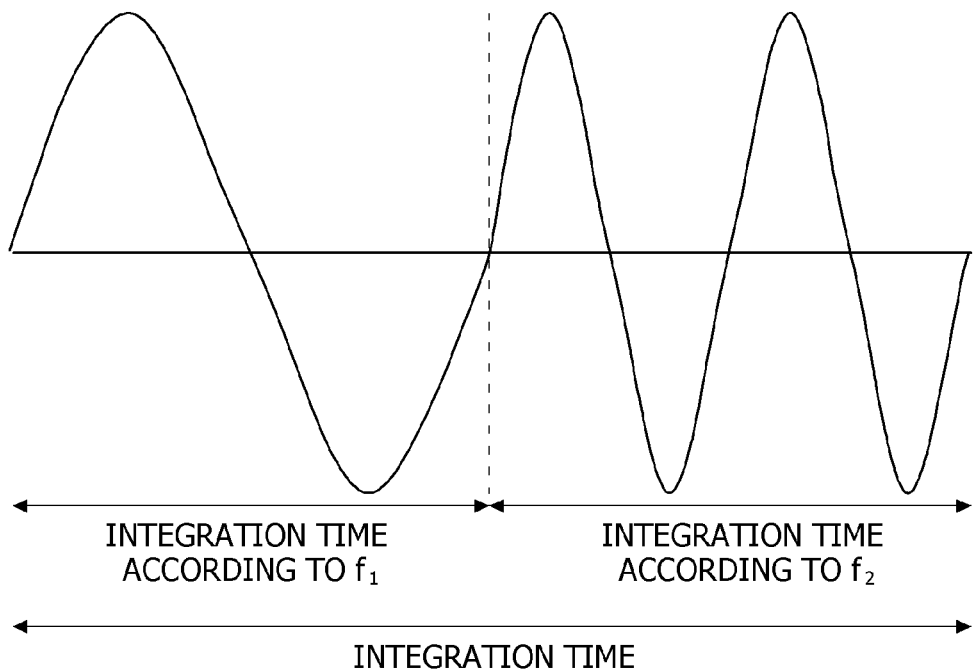
[FIG. 4]
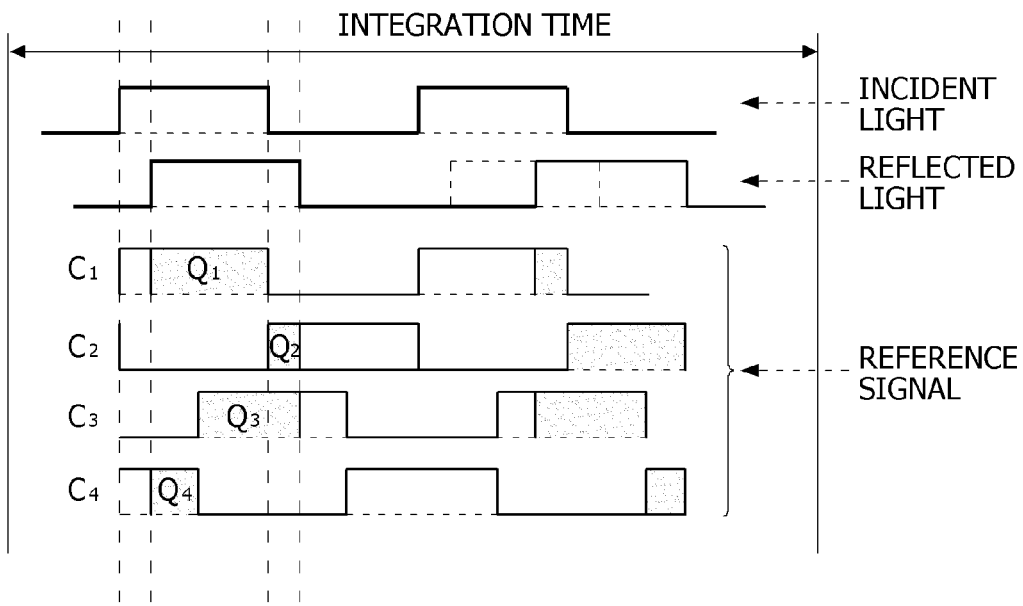

[FIG. 5]
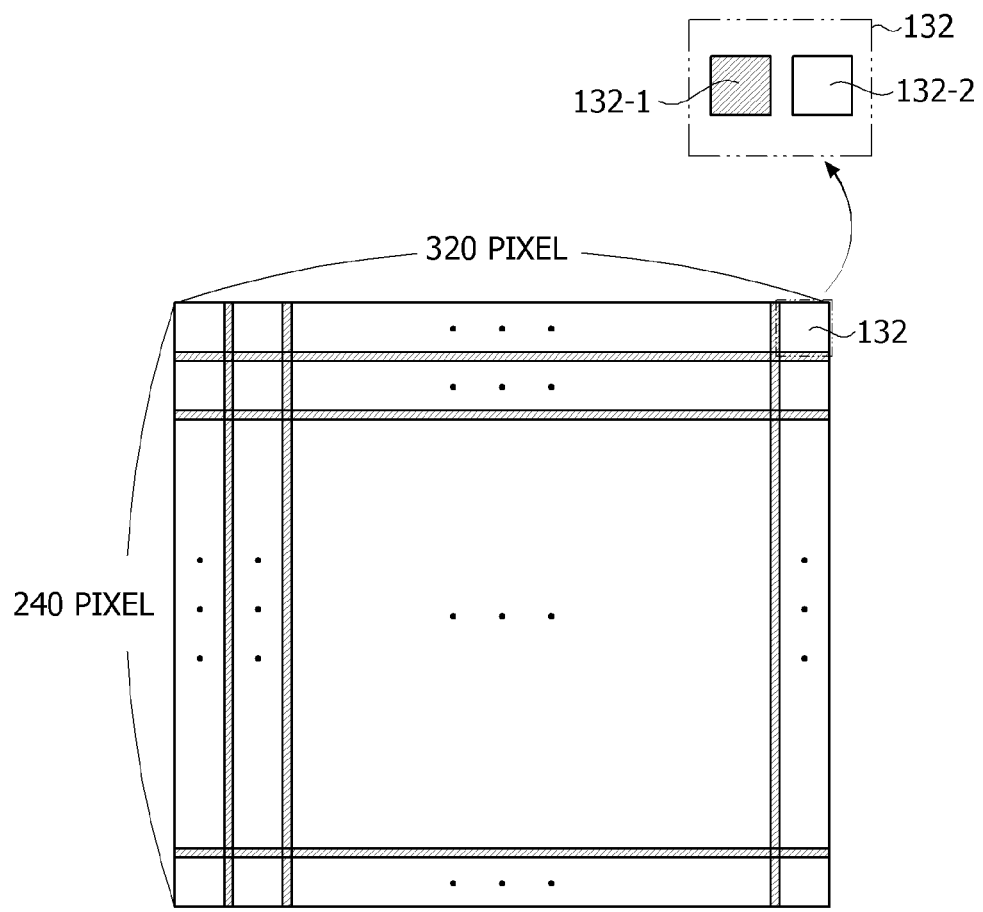
[FIG. 6]
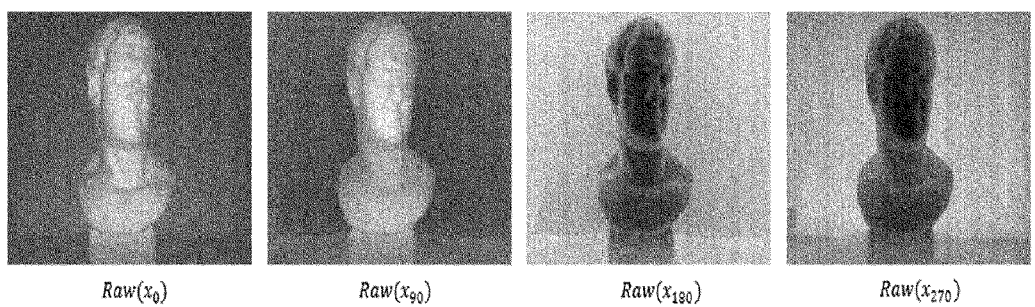

[FIG. 7]
[FIG. 8]
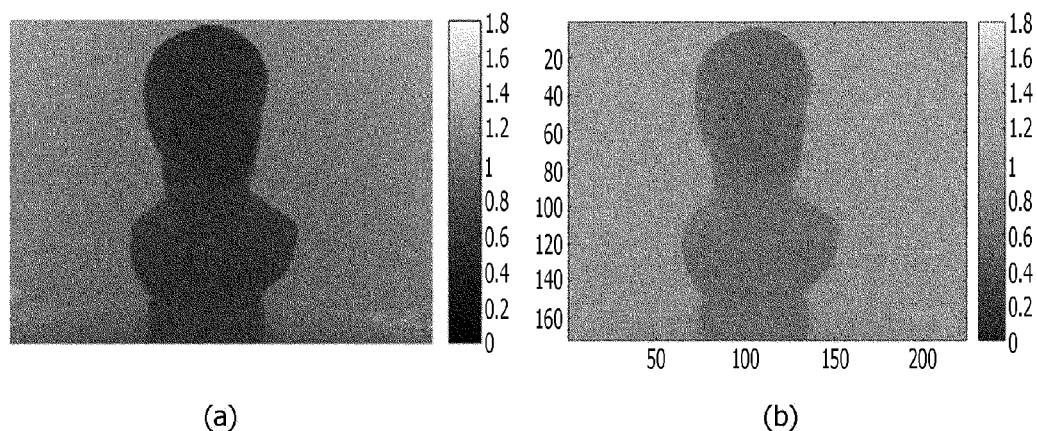
(a)　　　　　　　　　　　　(b)

[FIG. 9]
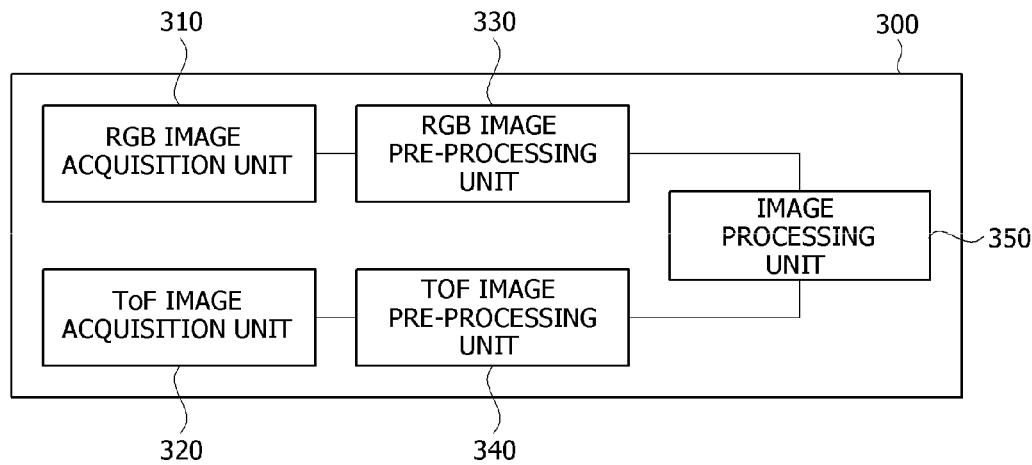
[FIG. 10]
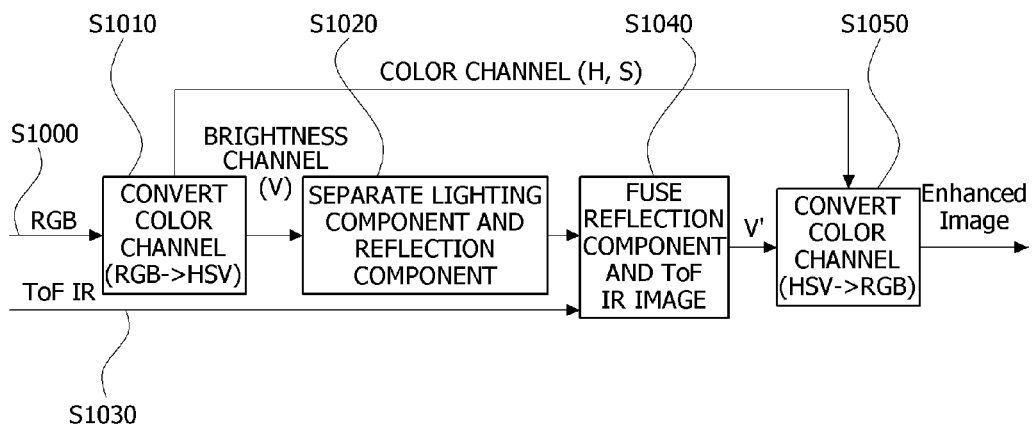
[FIG. 11]
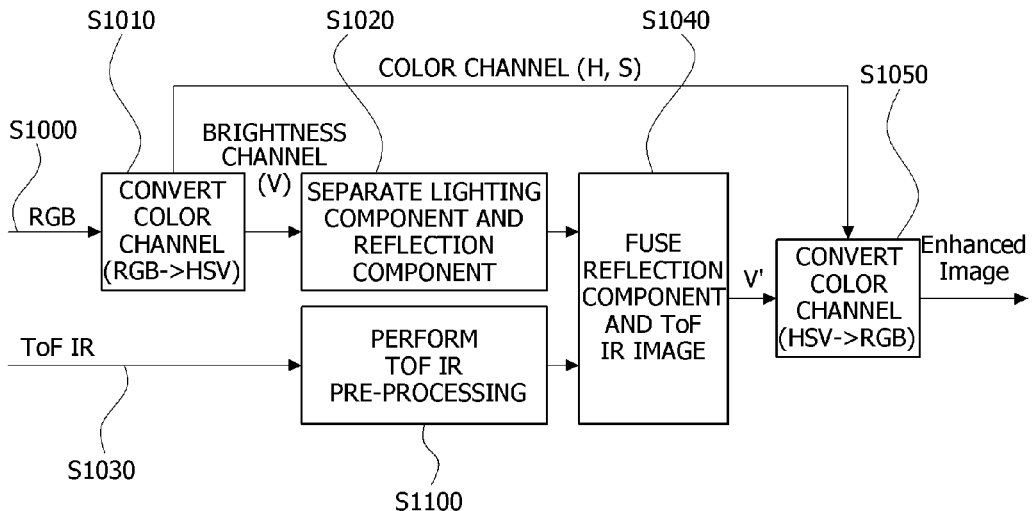

[FIG. 12]
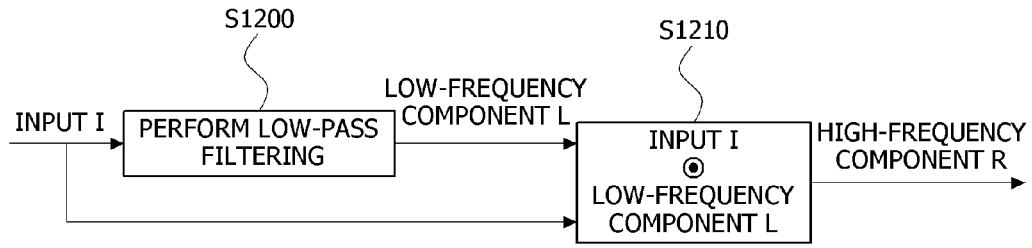
[FIG. 13]
[FIG. 14]
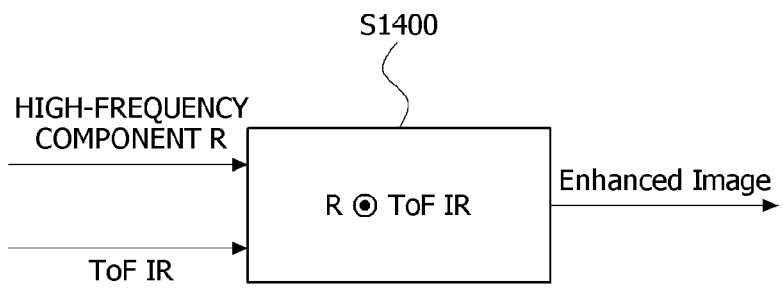
[FIG. 15]
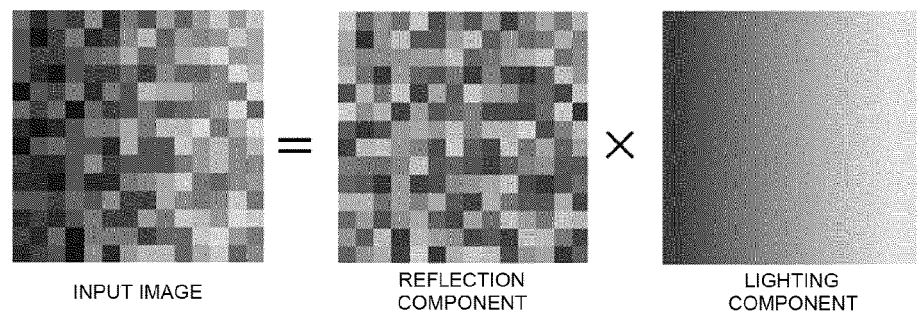

[FIG. 16]
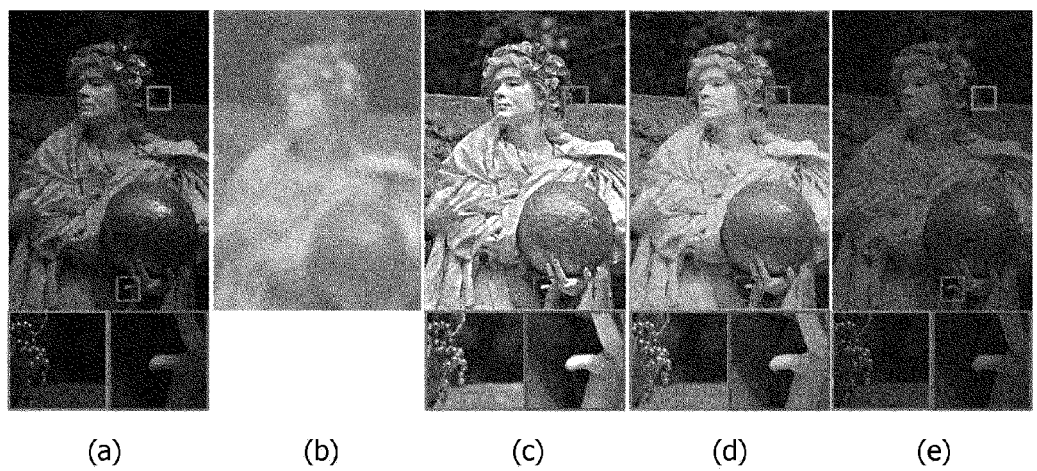
(a)        (b)        (c)        (d)        (e)

IMAGE PROCESSING DEVICE AND IMAGE PROCESSING METHOD

CROSS REFERENCE TO RELATED APPLICATIONS

This application is the National Phase of PCT International Application No. PCT/KR2019/010902, filed on Aug. 27, 2019, which claims priority under 35 U.S.C. 119(a) to Patent Application No. 10-2018-0100444, filed in the Republic of Korea on Aug. 27, 2018, all of which are hereby expressly incorporated by reference into the present application.

TECHNICAL FIELD

The present invention relates to an image processing device and an image processing method using a red-green-blue (RGB) camera and a time of flight (ToF) camera.

BACKGROUND ART

Red-green-blue (RGB) cameras generally mounted on mobile devices have a problem in that when capturing an image in a low light environment, the image quality is low due to very low brightness or heavy noise. As a method of improving the image quality of the RGB cameras in the low light environment, a flash function may be used. However, when the flash function is used, it may be difficult to obtain a natural image due to saturation of light at a short distance in which a flash is illuminated. As another method of improving the image quality of the RGB cameras in the low light environment, infrared ray (IR) sensors may be used together with the RGB cameras. However, the sensitivity of RGB colors may be degraded due to the IR sensor.

Accordingly, a new method of improving the image quality of the RGB cameras in the low light environment is required.

DISCLOSURE

Technical Problem

The present invention is directed to providing an image processing method and an image processing device that improve the image quality of a red-green-blue (RGB) camera using a time of flight (ToF) camera.

Technical Solution

One aspect of the present invention provides an image processing method of an image processing device, including acquiring a first RGB image using an RGB camera, extracting a reflection component from the first RGB image, acquiring a ToF infrared ray (IR) image using a ToF camera, and acquiring a second RGB image by calculating the reflection component of the first RGB image and the ToF IR image, wherein the ToF IR image is an amplitude image or intensity image generated from IR images for four phases.

The extracting of the reflection component may include converting the first RGB image into a first hue-saturation-value (HSV) image and acquiring the reflection component from a value component of the first HSV image.

The reflection component may include a high-frequency component of the value component of the first HSV image.

The acquiring of the reflection component may include performing low-pass filtering on the value component of the first HSV image, acquiring a low-frequency component from the value component of the first HSV image, and removing the low-frequency component from the value component of the first HSV image.

The acquiring of the second RGB image may include calculating the reflection component of the first RGB image and the ToF IR image, and acquiring the second RGB image by using a result value obtained by calculating the reflection component of the first RGB image and the ToF IR image and a hue component and a saturation component of the first HSV image.

The image processing method may further include correcting the ToF IR image between the acquiring of the ToF IR image using the ToF camera and the acquiring of the second RGB image.

The correcting of the ToF IR image may include interpolating the ToF IR image to have the same size as the first RGB image and correcting brightness of the ToF IR image.

Another aspect of the present invention provides an image processing device including an RGB image acquisition unit configured to acquire a first RGB image from an RGB camera, an RGB image pre-processing unit configured to extract a reflection component from the first RGB image, a ToF image acquisition unit configured to acquire a ToF IR image from a ToF camera, and an image processing unit configured to acquire a second RGB image by calculating the reflection component of the first RGB image and the ToF IR image, wherein the ToF IR image is an amplitude image or intensity image generated from IR images for four phases.

The RGB image pre-processing unit may convert the first RGB image into a first HSV image and then acquire the reflection component from a value component of the first HSV image.

The reflection component may include a high-frequency component of the value component of the first HSV image.

The RGB image pre-processing unit may perform low-pass filtering on the value component of the first HSV image, acquire a low-frequency component from the value component of the first HSV image, and remove the low-frequency component from the value component of the first HSV image.

The image processing unit may calculate the reflection component of the first RGB image and the ToF IR image and acquire a second RGB image by using a result value obtained by calculating the reflection component of the first RGB image and the ToF IR image and a hue component and a saturation component of the first HSV image.

The image processing device may further include a ToF image pre-processing unit configured to correct the ToF IR image before calculating the ToF IR image together with the reflection component of the first RGB image.

The ToF image pre-processing unit may interpolate the ToF IR image to have the same size as the first RGB image and correct brightness of the ToF IR image.

Advantageous Effects

Using the image processing device and method according to an embodiment of the present invention, a red-green-blue (RGB) image having excellent image quality can be obtained even in a low light environment. In particular, according to the image processing device and method according to the embodiment of the present invention, an RGB image having excellent image quality in a low light environment can be obtained without the need to add an additional component and without significantly increasing the amount of calculation.

DESCRIPTION OF DRAWINGS

FIG. 1 is a block diagram of an image processing system according to an embodiment of the present invention.

FIG. 2 is a block diagram of a time of flight (ToF) camera module according to the embodiment of the present invention.

FIG. 3 is a view for describing a frequency of an output light signal of the ToF camera module according to the embodiment of the present invention.

FIG. 4 is a view for describing an electrical signal generation process according to the embodiment of the present invention.

FIG. 5 is a view for describing an image sensor of the ToF camera module according to the embodiment of the present invention.

FIG. 6 shows four phase images obtained from the ToF camera module according to the embodiment of the present invention.

FIG. 7 is a ToF infrared ray (IR) image that may be obtained from the phase images of FIG. 6.

FIG. 8 is a depth image that may be obtained from the phase images of FIG. 6.

FIG. 9 is a block diagram of an image processing device included in the image processing system according to the embodiment of the present invention.

FIG. 10 is a view for describing an image processing method of the image processing device according to the embodiment of the present invention.

FIG. 11 is a view for describing an image processing method of an image processing device according to another embodiment of the present invention.

FIG. 12 is a view for describing a red-green-blue (RGB) image pre-processing method of the image processing device according to the embodiment of the present invention.

FIG. 13 is a view for describing a ToF IR image pre-processing method of the image processing device according to the embodiment of the present invention.

FIG. 14 is a view for describing a method of matching an RGB image and a ToF IR image by the image processing device according to the embodiment of the present invention.

FIG. 15 is a view for describing an image quality improvement principle of the image processing method according to the embodiment of the present invention in more detail.

FIG. 16 is a view for describing an image quality improvement effect of the image processing method according to the embodiment of the present invention.

MODES OF THE INVENTION

Hereinafter, exemplary embodiments of the present disclosure will be described in detail with reference to the accompanying drawings.

However, the technical spirit of the present invention is not limited to some described embodiments and may be implemented in various different forms, and one or more of components may be selectively combined or substituted between the embodiments within the scope of the technical spirit of the present invention.

Further, unless explicitly defined and described, terms (including technical and scientific terms) used in the embodiments of the present invention can be interpreted to have a meaning that may be generally understood by those skilled in the art to which the present invention pertains. Terms generally used, such as terms defined in the dictionary, may be interpreted in consideration of the meaning of the context of the related technology.

Further, terms used in the embodiments of the present invention are for describing the embodiments and are not intended to limit the present invention.

In the present specification, a singular form may include a plural form unless specifically mentioned in a phrase, and when "at least one (or one or more) of A, B, and C" is described, one or more of all combinations that may be combined with A, B, and C may be included.

Further, in the description of the components of the embodiments of the present invention, the terms such as first, second, A, B, (a) and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component interposed therebetween, and the first component may be directly connected or coupled to the second component.

Further, when it is described that a first component is formed or disposed "above" or "below" a second component, the terms "above" and "below" include that one or more third components may be formed or arranged between the first and second components, and the first and second components may be in direct contact with each other. Further, when the terms "above or below" are expressed, the terms "above or below" may include the meanings of a downward direction as well as an upward direction based on one component.

FIG. 1 is a block diagram of an image processing system according to an embodiment of the present invention, FIG. 2 is a block diagram of a time of flight (ToF) camera module according to the embodiment of the present invention, FIG. 3 is a view for describing a frequency of an output light signal of the ToF camera module according to the embodiment of the present invention, FIG. 4 is a view for describing an electric signal generation process according to the embodiment of the present invention, and FIG. 5 is a view for describing an image sensor of the ToF camera module according to the embodiment of the present invention. FIG. 6 shows four phase images obtained from the ToF camera module according to the embodiment of the present invention, FIG. 7 is a ToF infrared ray (IR) image that may be obtained from the phase images of FIG. 6, and FIG. 8 is a depth image that may be obtained from the phase images of FIG. 6.

Referring to FIG. 1, an image processing system 10 according to the embodiment of the present invention includes a ToF camera 100, a red-green-blue (RGB) camera 200, and an image processing device 300.

The ToF camera 100 is one device that may acquire depth information, and according to a ToF method, a distance to an object is calculated by measuring a flight time, that is, a time during which light is emitted, reflected, and then returned.

The RGB camera 200 may be a general camera that can capture an RGB image.

The ToF camera 100 and the RGB camera 200 may be arranged in one device, for example, one mobile device, to photograph the same area.

Further, the image processing device 300 may be connected to the ToF camera 100 and the RGB camera 200 and may fuse a ToF image acquired by the ToF camera 100 and the RGB image acquired by the RGB camera 200 to acquire a three-dimensional image.

Here, it is illustrated that the image processing device 300 is disposed in the image processing system 10 to be adjacent to the ToF camera 100 and the RGB camera, but the present invention is not limited thereto, and the image processing device 300 may be disposed remotely with the ToF camera 100 and the RGB camera 200. Alternatively, some functions of the image processing device 300 may be included in the ToF camera 100 and the RGB camera 200.

Referring to FIG. 2, the ToF camera module 100 includes a lighting unit 110, a lens unit 120, an image sensor unit 130, and an image control unit 140.

The lighting unit 110 generates an output light signal and then irradiates an object with the generated output light signal. In this case, the lighting unit 110 may generate and output the output light signal in the form of a pulse wave or a continuous wave. The continuous wave may be in the form of a sinusoid wave or a squared wave. By generating the output light signal in the form of the pulse wave or the continuous wave, the ToF camera module 100 may detect a phase difference between the output light signal output from the lighting unit 110 and an input light signal reflected from the object and then input to the ToF camera module 100. In the present specification, the output light may mean light output from the lighting unit 110 and incident on the object, and the input light may mean light output from the lighting unit 110, reaching the object, reflected from the object, and then input to the ToF camera module 100. From a viewpoint of the object, the output light may be incident light, and the input light may be reflected light.

The lighting unit 110 irradiates the object with the generated output light signal during a predetermined integration time. Here, the integration time means one frame period. When a plurality of frames are generated, the set integration time is repeated. For example, when the ToF camera module 100 photographs the object at 20 FPS, the integration time is ½₀ [sec]. Further, when 100 frames are generated, the integration time may be repeated 100 times.

The lighting unit 110 may generate a plurality of output light signals having different frequencies. The lighting unit 110 may sequentially repeatedly generate a plurality of output light signals having different frequencies. Alternatively, the lighting unit 110 may simultaneously generate the plurality of output light signals having different frequencies.

Referring to FIG. 3, the lighting unit 110 may control an output light signal having a frequency f1 to be generated during a first half of the integration time and may control an output light signal having a frequency f2 to be generated at the other half of the integration time.

According to another embodiment, the lighting unit 110 may control some of a plurality of light emitting diodes (LEDs) to generate the output light signal having the frequency f1 and may control the remaining LEDs to generate the output light signal having the frequency f2.

To this end, the lighting unit 110 may include a light source 112 that generates light and a light modulation unit 114 that modulates the light.

First, the light source 112 generates light. The light generated by the light source may be infrared light having a wavelength of 770 nm to 3000 nm or visible light having a wavelength of 380 nm to 770 nm. The light source may use an LED and have a form in which a plurality of LEDs are arranged according to a predetermined pattern. In addition, the light source 112 may include an organic light emitting diode (OLED) or a laser diode (LD). Alternatively, the light source 112 may be a vertical cavity surface emitting laser (VCSEL). The VCSEL is one of laser diodes that convert an electric signal into an optical signal and may use a wavelength of about 800 nm to 1000 nm, for example, about 850 nm or 940 nm.

The light source 112 repeatedly flickers at predetermined time intervals to generate an output light signal in the form of a pulse wave or a continuous wave. The predetermined time intervals may be the frequency of the output light signal. The flickering of the light source may be controlled by the light modulation unit 114.

The light modulation unit 114 controls the flickering of the light source 112 so that the light source 112 generates the output light signal in the form of a continuous wave or a pulse wave. The light modulation unit 114 may control the light source 112 to generate the output light signal in the form of a continuous wave or a pulse wave through frequency modulation, pulse modulation, or the like.

Meanwhile, the lens unit 120 collects the input light signals reflected from the object and transmits the collected input light signal to the image sensor unit 130.

Referring back to FIG. 2, the image sensor unit 130 generates an electric signal by using the input light signal collected through the lens unit 120.

The image sensor unit 130 may be synchronized with a flickering period of the lighting unit 110 to absorb the input light signal. In detail, the image sensor unit 130 may absorb light in an in-phase or out-phase with the output light signal output from the lighting unit 110. That is, the image sensor unit 130 may repeatedly perform absorbing an incident light signal when the light source is turned on and absorbing the incident light signal when the light source is turned off.

Next, the image sensor unit 130 may generate an electric signal corresponding to each reference signal using a plurality of reference signals having different phase differences. The frequency of the reference signal may be set to be equal to the frequency of the output light signal output from the lighting unit 110. Thus, when the lighting unit 110 generates the output light signal having a plurality of frequencies, the image sensor unit 130 generates electric signals using the plurality of reference signals corresponding to the frequencies. The electric signal may include information on an electric charge amount or a voltage corresponding to each reference signal.

As illustrated in FIG. 4, the number of reference signals according to the embodiment of the present invention may be four ($C_1$ to $C_4$). The reference signals $C_1$ to $C_4$ may have the same frequency as the output light signal but may have a phase difference of 90 degrees therebetween. One reference signal $C_1$ of the four reference signals may have the same phase as the output light signal. The phase of the input light signal is delayed by a distance by which the output light signal is incident on the object, is reflected, and is returned. The image sensor unit 130 mixes the input light signal and the reference signals. Then, the image sensor unit 130 may generate an electric signal corresponding to a shaded portion of FIG. 4 according to each reference signal.

As another example, when output light signals are generated at a plurality of frequencies during the exposure time, the image sensor unit 130 absorbs the input light signals according to the plurality of frequencies. For example, it is assumed that the output light signals are generated at the frequencies $f_1$ and $f_2$, and the plurality of reference signals have a phase difference of 90 degrees. Then, since the incident light signals have the frequencies $f_1$ and $f_2$, four electric signals may be generated through the input light signal having the frequency $f_1$ and four reference signals corresponding thereto. Further, four electric signals may be generated through the input light signal having the frequency $f_2$ and four reference signals corresponding thereto. Thus, a total of eight electric signals may be generated.

The image sensor unit 130 may be configured in a structure in which a plurality of pixels are arranged in a grid form. The image sensor unit 130 may be a complementary metal oxide semiconductor (CMOS) image sensor or a charge coupled device (CCD) image sensor. Further, the image sensor unit 130 may include a ToF sensor that receives infrared light reflected from a subject and measures a distance using a time or a phase difference.

Referring to FIG. 5, in the case of the image sensor unit 130 having a resolution of 320×240, 76,800 pixels are arranged in a grid form. In this case, a predetermined interval may be formed between the plurality of pixels as in a shaded portion of FIG. 5. In the embodiment of the present invention, one pixel as well as a predetermined interval between adjacent pixels will be described.

According to the embodiment of the present invention, each pixel 132 may include a first light reception unit 132-1 including a first photodiode and a first transistor and a second light reception unit 132-2 including a second photodiode and a second transistor.

The first light reception unit 132-1 receives the input light signal having the same phase as the waveform of the output light. That is, when the light source is turned on, the first photodiode is turned on to absorb the input light signal. Further, when the light source is turned off, the first photodiode is turned off to stop the absorption of the input light. The first photodiode converts the absorbed input light signal into a current and transmits the converted current to the first transistor. The first transistor converts the received current into an electric signal and outputs the converted electric signal.

The second light reception unit 132-2 receives the input light signal having a phase opposite to the waveform of the output light. That is, when the light source is turned on, the second photodiode is turned off to absorb the input light signal. Further, when the light source is turned off, the second photodiode is turned on to stop the absorption of the input light. The second photodiode converts the absorbed input light signal into a current and transmits the converted current to the second transistor. The second transistor converts the received current into an electric signal.

Accordingly, the first light reception unit 132-1 may be an in-phase reception unit, and the second light reception unit 132-2 may be an out-phase reception unit. In this way, when the first light reception unit 132-1 and the second light reception unit 132-2 are activated with a time difference, a difference occurs in the amount of received light according to the distance to the object. For example, when the object is located directly in front of the ToF camera module 100 (that is, when the distance is zero), a time during which the light is output from the lighting unit 110, reflected from the object, and then returned is zero, and thus a flickering period of the light source is a reception period of light. Accordingly, only the first light reception unit 132-1 receives the light, and the second light reception unit 132-2 may not receive the light. As another example, when the object is located away from the ToF camera module 100 by a predetermined distance, a time during which the light is output from the lighting unit 110, reflected from the object, and then returned is taken, and thus the flickering period of the light source is different from the reception period of the light. Accordingly, a difference occurs in the amount of light received by the first light reception unit 132-1 and the amount of light received by the second light reception unit 132-2. That is, the distance to the object may be calculated using a difference between the amount of light input to the first light reception unit 132-1 and the amount of light input to the second light reception unit 132-2.

Referring back to FIG. 2, the image control unit 140 calculates a phase difference between the output light and the input light using the electric signal received from the image sensor unit 130 and calculates a distance between the object and the ToF camera module 100 using the phase difference.

In detail, the image control unit 140 may calculate the phase difference between the output light and the input light using electric charge information of the electric signal.

As described above, the four electric signals may be generated for each frequency of the output light signal. Thus, the image control unit 140 may calculate the phase difference to between the output light signal and the input light signal using Equation 1 below.

$$t_d = \arctan\left(\frac{Q_3 - Q_4}{Q_1 - Q_2}\right) \qquad \text{[Equation 1]}$$

Here, $Q_1$ to $Q_4$ denote charge amounts of the four electric signals. $Q_1$ denotes a charge amount of an electric signal corresponding to a reference signal having the same phase as the output light signal. $Q_2$ denotes a charge amount of an electric signal corresponding to a reference signal having a phase delayed from the output light signal by 180 degrees. $Q_3$ denotes a charge amount of an electric signal corresponding to a reference signal having a phase delayed from the output light signal by 90 degrees. $Q_4$ denotes a charge amount of an electric signal corresponding to a reference signal having a phase delayed from the output light signal by 270 degrees.

Then, the image control unit 140 may calculate a distance between the object and the ToF camera module 100 using the phase difference between the output light signal and the input light signal. In this case, the image control unit 140 may calculate the distance d between the object and the ToF camera module 100 using Equation 2 below.

$$d = \frac{c}{2f} \frac{t_d}{2\pi} \qquad \text{[Equation 2]}$$

Here, c denotes the speed of light, and f denotes the frequency of the output light.

According to the embodiment of the present invention, a ToF IR image and a depth image may be obtained from the ToF camera module 100.

In more detail in this regard, as illustrated in FIG. 6, raw images for four phases may be obtained from the ToF camera module 100 according to the embodiment of the present invention. Here, the four phases may be 0°, 90°, 180°, and 270°, and the raw image for each phase may be an image formed with digitized pixel values for each phase and may be used interchangeably with a phase image, a phase IR image, or the like.

When Equation 3 is calculated using the four phase images of FIG. 6, an amplitude image that is the ToF IR image of FIG. 7 may be obtained.

$$\text{Amplitude} = \frac{1}{2}\sqrt{(\text{Raw}(x_{90}) - \text{Raw}(x_{270}))^2 + (\text{Raw}(x_{180}) - \text{Raw}(x_0))^2} \quad \text{[Equation 3]}$$

Here, $\text{Raw}(x_0)$ denotes a pixel-specific data value received by a sensor at a phase 0°, $\text{Raw}(x_{90})$ denotes a pixel-specific data value received by the sensor at a phase 90°, $\text{Raw}(x_{180})$ denotes a pixel-specific data value received by the sensor at a phase 180°, and $\text{Raw}(x_{270})$ denotes a pixel-specific data value received by the sensor at a phase 270°.

Alternatively, when Equation 4 is calculated using the four phase images of FIG. 7, an intensity image that is another ToF IR image may be obtained.

$$\text{Intensity} = |\text{Raw}(x_{90}) - \text{Raw}(x_{270})| + |\text{Raw}(x_{180}) - \text{Raw}(x_0)| \quad \text{[Equation 4]}$$

Here, $\text{Raw}(x_0)$ denotes a pixel-specific data value received by the sensor at a phase 0°, $\text{Raw}(x_{90})$ denotes a pixel-specific data value received by the sensor at a phase 90°, $\text{Raw}(x_{180})$ denotes a pixel-specific data value received by the sensor at a phase 180°, and $\text{Raw}(x_{270})$ denotes a pixel-specific data value received by the sensor at a phase 270°.

In this way, the ToF IR image is an image generated through a process of subtracting two of the four phase images from each other, and in this process, background light may be removed. Accordingly, only a signal having a wavelength band output from the light source remains in the ToF IR image, thereby increasing the IR sensitivity of the object and significantly reducing noise.

In the present specification, the ToF IR image may mean the amplitude image or the intensity image, and the intensity image may be used interchangeably with a confidence image. As illustrated in FIG. 7, the ToF IR image may be a gray image.

Meanwhile, when Equations 5 and 6 are calculated using the four phase images of FIG. 6, the depth image of FIG. 8 may be obtained.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 5]}$$

$$\text{Depth} = \frac{1}{2f} c \frac{\text{Phase}}{2\pi} \ (c = \text{speed of light}) \quad \text{[Equation 6]}$$

FIG. 9 is a block diagram of an image processing device included in the image processing system according to the embodiment of the present invention.

Referring to FIG. 9, the image processing device 300 includes an RGB image acquisition unit 310 that acquires an RGB image from the RGB camera 200, a ToF image acquisition unit 320 that acquires a ToF image from the ToF camera 100, an RGB image pre-processing unit 330 that pre-processes the RGB image, a ToF image pre-processing unit 340 that pre-processes the ToF image, and an image processing unit 350 that acquires a three-dimensional image using the images pre-processed by the RGB image pre-processing unit 330 and the ToF image pre-processing unit 340. As described above, the ToF image that may be obtained from the ToF camera 100 may be a ToF IR image and a depth image. The image processing unit 350 may generate a three-dimensional color image including both color information and the depth information by matching and rendering the RGB image and the depth image.

Meanwhile, according to the embodiment of the present invention, the image processing device 300 may improve the image quality of the RGB image captured by the RGB camera 200 in a low light environment using the ToF IR image acquired by the ToF camera 100.

FIG. 10 is a view for describing an image processing method of the image processing device according to the embodiment of the present invention, and FIG. 11 is a view for describing an image processing method of an image processing device according to another embodiment of the present invention. FIG. 12 is a view for describing an RGB image pre-processing method of the image processing device according to the embodiment of the present invention, FIG. 13 is a view for describing a ToF IR image pre-processing method of the image processing device according to the embodiment of the present invention, and FIG. 14 is a view for describing a method of matching an RGB image and a ToF IR image by the image processing device according to the embodiment of the present invention.

Referring to FIG. 10, the image processing device 300 acquires an RGB image from the RGB camera 200 (S1000). Hereinafter, in the present specification, the RGB image obtained from the RGB camera 200 and prior to the pre-processing may be referred to as a first RGB image.

The RGB image pre-processing unit 330 converts the first RGB image into a first hue-saturation-value (HSV) image through color channel conversion (S1010). Here, the RGB image may mean data expressed by a combination of three components including red, green, and blue, and the HSV image may mean data expressed by a combination of three components including hue, saturation, and value. Here, the hue and the saturation may have color information, and the value may have brightness information.

Further, the RGB image pre-processing unit 330 separates a value component V among a hue component H, a saturation component S, and the value component V of the first HSV image into a reflection component and a lighting component and extracts the reflection component (S1020). Here, the reflection component may include a high-frequency component, and the lighting component may include a low-frequency component. Hereinafter, a case in which, in order to extract the reflection component, the value component V is separated into the low-frequency component and the high-frequency component and an example of the high-frequency component is separated therefrom will be described, but the present invention is not limited thereto. The reflection component, for example, the high-frequency component, may include gradient information or edge information of an image, and the lighting component, for example, the low-frequency component, may include brightness information of the image.

To this end, referring to FIG. 12, the RGB image pre-processing unit 330 performs low-pass filtering on the value component V of the first HSV image that is an input I and acquires the low-frequency component L (S1200). When the low-pas filtering is performed on the input I, the image is blurred, and thus the gradient information or the edge information may be lost. Further, the high-frequency component R for the value component of the first HSV image is obtained through a calculation of removing the low-frequency component L from the input I (S1210). To this end, the input I and the low-frequency component L may be calculated. For example, a calculation of subtracting the low-frequency component L from the input I may be performed.

Meanwhile, the image processing device 300 acquires the ToF IR image from the ToF camera 100 (S1030). Here, the ToF IR image may be the amplitude image or the intensity image generated from IR images for four phases of 0°, 90°, 180° and 270°. The amplitude image may be generated as described in FIGS. 6 to 7 and Equations 3 and 4.

In this case, referring to FIG. 11, the ToF IR image may be pre-processed by the ToF image pre-processing unit 340 (S1100). For example, referring to FIG. 13, the ToF IR image may have a size different from the first RGB image, and generally, the ToF IR image may be smaller than the first RGB image. Accordingly, the ToF image pre-processing unit 340 may perform interpolation on the ToF IR image to enlarge the size of the ToF IR image to the size of the first RGB image (S1300). Since the image may be distorted in the interpolation process, the ToF image pre-processing unit 340 may correct the brightness of the ToF IR image (S1310).

Referring back to FIG. 10, the image processing unit 350 acquires a value component V' of a second HSV image using a reflection component for the value component of the first HSV image, for example, the high-frequency component, and the ToF IR image (S1040). In detail, as illustrated in FIG. 14, the reflection component for the value component of the first HSV image, for example, the high-frequency component, and the ToF IR image may be matched (S1400). Here, a calculation for obtaining an image having improved brightness by merging the lighting component and the reflection component modeled using the ToF IR image may be used, and this calculation may be a calculation opposite to the calculation used to remove the low-frequency component L from the input image I in step S1210. For example, in step S1400, a calculation of adding the reflection component for the brightness component of the first HSV image, for example, the high frequency component, and the ToF IR image may be performed. In this way, after removing the lighting component for the value component of the first HSV image, for example, the low-frequency component, when the reflection component for the value component of the first HSV image, for example, the high-frequency component and the ToF IR image are calculated, the brightness of the RGB image captured in the low light environment may be improved.

Thereafter, the image processing device 300 generates a second RGB image through color channel conversion using the value component V' acquired in step S1040 and the hue component H and the saturation component S acquired in step S1010 (S1050). In the HSV image, the hue component H and the saturation component S may have the color information, and the value component V may have the brightness information. As in the embodiment of the present invention, when a value V', which is obtained by calculating only the reflection component of the value component V and the ToF IR image, the hue component H, and the saturation component S are used as obtained in step S1010, only the brightness in the low light environment can be improved.

FIG. 15 is a view for describing an image quality improvement principle of the image processing method according to the embodiment of the present invention in more detail, and FIG. 16 is a view for describing an image quality improvement effect of the image processing method according to the embodiment of the present invention.

Referring to FIG. 15, an input image may be formed by a product of a reflection component and a lighting component, the reflection component may be formed as a high-frequency component, the lighting component may be formed as a low-frequency component, and the brightness of the image may be affected by the lighting component. However, when the lighting component, that is, the low-frequency component, is removed from an RGB image captured in the low light environment, a brightness value of the RGB image may be excessively increased. In the embodiment of the present invention, in order to compensate for this point, a ToF IR image is matched to a value component of the RGB image from which the lighting component, that is, the low-frequency component is removed, and as a result, the RGB image having improved image quality can be obtained in the low light environment.

Referring to FIG. 16, FIG. 16A is an RGB image captured in the low light environment, FIG. 16B is a ToF IR image, FIG. 16C is an RGB image processed according to the embodiment of the present invention, FIG. 16D is an RGB image processed according to a fog removal technique, and FIG. 16E is an RGB image processed according to a technique of performing optimization using a variational retinex model as a cost function. Referring to FIG. 16, it can be seen that the best image quality can be obtained from FIG. 16C which is processed according to the embodiment of the present invention.

The embodiments have been described above but are merely illustrative and do not limit the present invention, and those skilled in the art to which the present invention pertains may derive various modifications and applications not illustrated above without departing from the essential feature of the present embodiment. For example, each component specifically illustrated in the embodiments can be modified and implemented. Further, differences related to these modifications and applications should be construed as being included in the scope of the present invention defined in the appended claims.

The invention claimed is:

1. An image processing method of an image processing device, comprising:
acquiring a first red-green-blue (RGB) image using an RGB camera;
extracting a reflection component from the first RGB image;
acquiring a time of flight (ToF) infrared ray (IR) image using a ToF camera; and
acquiring a second RGB image by adding the reflection component of the first RGB image and the ToF IR image,
wherein the ToF IR image is an amplitude image or an intensity image generated from IR images for four phases, and
wherein the extracting of the reflection component includes:
converting the first RGB image into a first hue-saturation-value (HSV) image; and
acquiring the reflection component from a value component of the first HSV image.

2. The image processing method of claim 1, wherein the reflection component includes a high-frequency component of the value component of the first HSV image.

3. The image processing method of claim 2, wherein the acquiring of the reflection component includes:
performing low-pass filtering on the value component of the first HSV image;
acquiring a low-frequency component from the value component of the first HSV image; and
removing the low-frequency component from the value component of the first HSV image.

4. The image processing method of claim 1, wherein the acquiring of the second RGB image includes:
adding the reflection component and the ToF IR image; and
acquiring the second RGB image by using a result value obtained by adding the reflection component and the ToF IR image and a hue component and a saturation component of the first HSV image.

5. The image processing method of claim 1, wherein the reflection component includes a gradient information or an edge information.

6. The image processing method of claim 1, further comprising correcting the ToF IR image between the acquiring of the ToF IR image using the ToF camera and the acquiring of the second RGB image.

7. The image processing method of claim 6, wherein the correcting of the ToF IR image includes:
interpolating the ToF IR image to have the same size as the first RGB image; and
correcting brightness of the ToF IR image.

8. An image processing device comprising:
an red-green-blue (RGB) image acquisitor configured to acquire a first RGB image from an RGB camera;
an RGB image pre-processor configured to extract a reflection component from the first RGB image;
a time of flight (ToF) image acquisitor configured to acquire a ToF infrared ray (IR) image from a ToF camera; and
an image processor configured to acquire a second RGB image by adding the reflection component of the first RGB image and the ToF IR image,
wherein the ToF IR image is an amplitude image or an intensity image generated from IR images for four phases, and
wherein the RGB image pre-processor converts the first RGB image into a first hue-saturation-value (HSV) image and then acquires the reflection component from a value component of the first HSV image.

9. The image processing device of claim 8, wherein the reflection component includes a high-frequency component of the value component of the first HSV image.

10. The image processing device of claim 9, wherein the RGB image pre-processor performs low-pass filtering on the value component of the first HSV image, acquires a low-frequency component from the value component of the first HSV image, and removes the low-frequency component from the value component of the first HSV image.

11. The image processing device of claim 8, wherein the image processor adds the reflection component and the ToF IR image and acquires the second RGB image by using a result value obtained by adding the reflection component and the ToF IR image and a hue component and a saturation component of the first HSV image.

12. The image processing device of claim 8, further comprising a ToF image pre-processor configured to correct the ToF IR image before adding the ToF IR image together with the reflection component of the first RGB image.

13. The image processing device of claim 12, wherein the ToF image pre-processor interpolates the ToF IR image to have the same size as the first RGB image; and corrects brightness of the ToF IR image.

14. The image processing device of claim 8, wherein at least one of the amplitude image or the intensity image is an image from which a background light has been removed.

15. The image processing device of claim 14, wherein at least one of the amplitude image or the intensity image is generated through subtracting two of four phase images from each other.

16. An image processing system comprising:
an red-green-blue (RGB) camera;
a time of flight (ToF) camera; and
an image processing device,
wherein the image processing device includes:
an red-green-blue (RGB) image acquisitor configured to acquire a first RGB image from the RGB camera;
an RGB image pre-processor configured to extract a reflection component from the first RGB image;
a time of flight (ToF) image acquisitor configured to acquire a ToF infrared ray (IR) image from the ToF camera; and
an image processor configured to acquire a second RGB image by adding the reflection component of the first RGB image and the ToF IR image,
wherein the ToF IR image is an amplitude image or an intensity image generated from IR images for four phases, and
wherein the RGB image pre-processor converts the first RGB image into a first hue-saturation-value (HSV) image and then acquires the reflection component from a value component of the first HSV image.

17. The image processing system of claim 16, wherein the RGB camera and the ToF camera are arranged in one device to photograph the same area.

18. The image processing system of claim 16, wherein the ToF camera includes one of an organic light emitting diode, a laser diode and a vertical cavity surface emitting laser.

* * * * *